United States Patent [19]

Colin

[11] Patent Number: 5,043,081

[45] Date of Patent: Aug. 27, 1991

[54] METHOD OF CHEMICALLY FIXING LIQUID AQUEOUS SLUDGE BY MEANS OF A POZZOLANIC REACTION

[75] Inventor: Francois Colin, Nancy, France

[73] Assignee: Agence Nationale pour la Recuperation et L'Elimination des Dechets, Angers, France

[21] Appl. No.: 483,801

[22] Filed: Feb. 23, 1990

[30] Foreign Application Priority Data

Feb. 24, 1989 [FR] France .................................. 8902430

[51] Int. Cl.$^5$ ............................................. C02F 11/14
[52] U.S. Cl. ..................................... 210/751; 210/724; 106/791; 106/792; 106/816
[58] Field of Search ............... 210/749, 751, 723, 724, 210/609; 106/790–794, 796, 812, 816

[56] References Cited

U.S. PATENT DOCUMENTS

| | | | |
|---|---|---|---|
| 4,514,307 | 4/1985 | Chestnut et al. | 210/751 |
| 4,675,114 | 6/1987 | Zagyvai et al. | 210/725 |
| 4,902,431 | 2/1990 | Nicholson et al. | 210/751 |

Primary Examiner—Stanley S. Silverman
Assistant Examiner—Neil McCarthy
Attorney, Agent, or Firm—Sandler, Greenblum & Bernstein

[57] ABSTRACT

A liquid aqueous sludge is transferred into a cylindrical-conical tank and agitated by blowing in air through a downwardly extending tube. A closed circulation of sludge is established between this main tank and a reagent tank by means of a recycling pump. The reagent tank overflows into the main tank. Chalk is added to the reagent tank and a pozzolanic material is added to the main tank. When the mixture of dilute sludge, chalk and possolanic material is homogeneous, it is transferred to a filter press by means of a further pump. The filter cake is collected for final storage or discharged to set slowly.

11 Claims, 1 Drawing Sheet

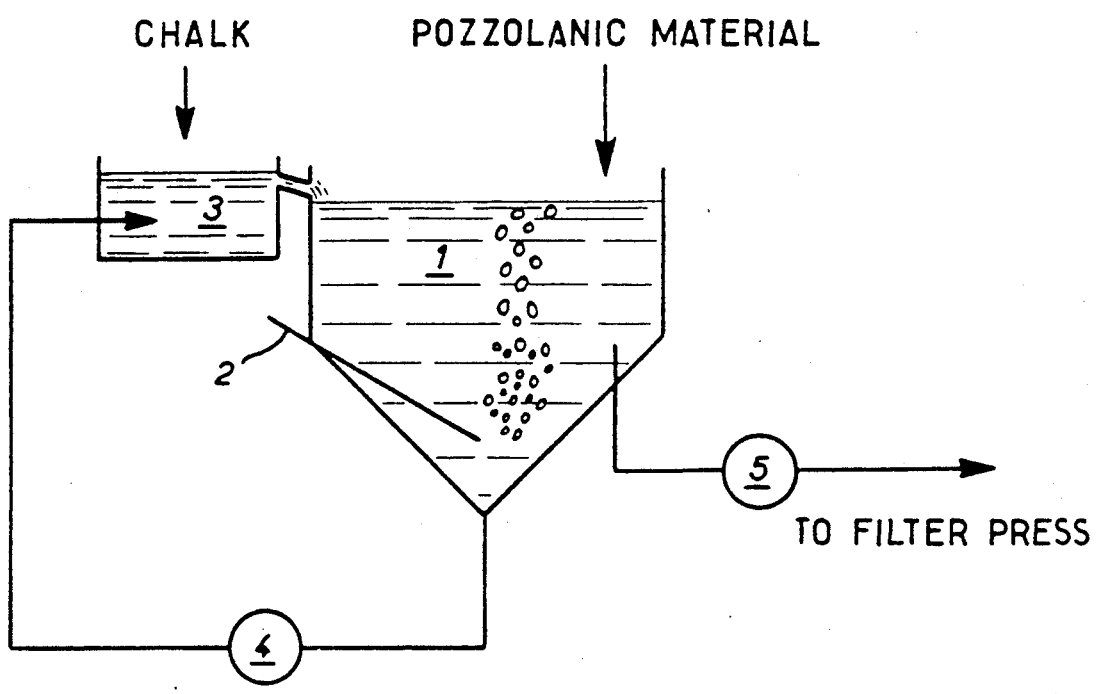

METHOD OF CHEMICALLY FIXING LIQUID AQUEOUS SLUDGE BY MEANS OF A POZZOLANIC REACTION

BACKGROUND OF THE INVENTION

1. Field of the Invention

The invention concerns a method of fixing aqueous sludge by means of a pozzolanic reaction.

2. Description of the Prior Art

Waste sludge containing toxic products in the solid phase can be harmful to the environment into which it is discharged because the solid phase is very finely dispersed and therefore has a very large surface area interface with external surroundings. This inevitably favors to a very considerable degree the passing into solution of toxic pollutants as a result of physical dissolving, hydrolysis, biodegradation and other phenomena. Additionally, such sludge includes an interstitial aqueous liquid phase which is itself contaminated to a greater or lesser degree and which constitutes a more mobile fraction.

The environment pollution problem is solved by fixing such sludge using various methods including methods utilizing pozzolanic reactions.

The pozzolanic capacity of a mineral is its capacity for fixing chalk at ordinary temperature to produce a hydraulic binder, by which is meant a substance able to set and therefore to harden and solidify in the presence of water.

This effect is extremely slow and it begins some two to three days after the mixing is done. The material changes very slowly with time and several years may be required to achieve the maximum mechanical strength.

The most commonly used pozzolanic material is fly ash with a particle size in the order of 1/30 micron. A distinction is drawn between silica-alumina ash resulting from the combustion of coal and sulfo-calcic ash produced by burning lignite.

In practice the pozzolanic effect of fly ash can be employed by simultaneously adding such ash and chalk to the sludge to be treated.

The chalk may already be present (in the form of $Ca(OH)_2$) in the sludge (neutralization or precipitation sludge containing excess chalk).

Commercial processes using pozzolanic reactions are already known from such general works as R. B. POJASEK "Toxic and hazardous waste disposal" volume 1. Ann Arbor Science 1979 and U.S. E.P.A. "Survey of solidification/stabilization technology for hazardous industrial wastes" E.P.A. - 600/2-79-056 July 1979.

The POZ-O-TEC process developed by the American company I.U.C.S. uses fly ash and other additives. Two reactions take place simultaneously: a fast reaction between the soluble salts and the chalk and alumina present in the fly ash, and a much slower pozzolanic reaction between the silica and the chalk.

Immediately after treatment the sludge is in the form of a viscous fluid that can be pumped and that is allowed to harden for several weeks at its storage site.

This process was developed for treating sludge resulting from SO washing of thermal power plant smoke and was subsequently used to solidify liquid waste produced by chemical and metal surface treatment industries.

Variants of this process are used in the Research-Cottrell process (see R. B. POJASEK reference above). The treatment system includes a gravity thickener, a centrifuge for dehydrating the sludge, a fly ash conveyor, a chalk conveyor and a dehydrated sludge/fly ash/chalk mixer.

In the case of waste sludge from metal surface treatment, a centrifuge or a conveyor belt press produces a residue containing approximately 80% by weight water. A filter press produces residue containing approximately 70% water.

This high water content has disadvantages because large quantities of chalk and pozzolan are needed to make it set and this results in large weights and volumes of solid waste to be stored.

What is more, the Research-Cottrell mixer must be a powerful and rugged unit, as its function is to intimately mix with the fly ash and chalk a thick medium consisting of the centrifugally concentrated sludge.

An object of the invention is to propose a method of treating relatively low concentration sludge (containing, for example, approximately 3 to 20% by weight of dry material relative to the weight of the sludge) that is simpler in that it does not require a powerful mixer, but which secures improved separation between the solid phase and the liquid phase of the sludge. In other words, the process according to the present invention, recovers 35 to 40% of the aqueous phase of the initial sludge. This aqueous phase can be recycled or purified, for example by means of ion exchanger resins.

SUMMARY OF THE INVENTION

The present invention consists in a method of chemically of fixing liquid aqueous sludge by means of a pozzolanic reaction, wherein said liquid aqueous sludge is first mixed with a pozzolanic material and optionally with chalk if the sludge does not have a sufficiently high initial content of calcium hydroxide to react with all of the pozzolanic reagent to obtain a substantially homogeneous mixture which is then dried mechanically to produce a solid cake which sets slowly and can be stored.

In more detail, the above process is carried out in the following successive stages:

a) if necessary, the pH of the sludge is adjusted to a value greater than 9;

b) the product obtained in step a) is mixed with the pozzolanic material and if necessary with chalk so that the resulting homogeneous mixture has a content of sludge dry material, calcium hydroxide, pozzolanic material in the weight ratio of calcium hydroxide/dry material between 1 and 2 and pozzolanic material/calcium hydroxide of approximately 2; and c) this homogeneous mixture is dehydrated mechanically.

In the context of this invention, the term "chalk" is to be understood as meaning either quicklime (CaO) or deadlime ($Ca(OH)_2$).

By "mechanical dewatering" is meant the more or less complete elimination of the liquid phase from a sludge by application of a force or pressure field, for example by filtering or centrifuging.

The method in accordance with the invention has many advantages:

The agitation is applied to a relatively fluid dilute aqueous substance which quickly obtains better homogenization of the solids (waste, chalk, pozzolanic material) in the aqueous phase than is the case in the Research-Cottrell process.

The pozzolanic material gives this mixture improved dehydration capabilities, in particular, by making the filter cakes less compressible and more permeable than those obtained merely by filtering the sludge.

The recovered solid phase solidifies slowly into a kind of stone that has good resistance to erosion and leaching.

Finally, this method can be used with no modification to an existing treatment station other than adding the installation for storing and metering the pozzolanic material.

In addition to the arrangements already described, the invention comprises other arrangements that will emerge from the following description given with reference to examples of implementation of the method in accordance with the present invention and to the appended diagrammatic drawing in which the single figure is a schematic view of an installation for implementing the method in accordance with the invention.

SLUDGE TREATMENT TESTING EXAMPLES

1. Definition of the sludge by composition a) First sludge $V_1$.

To enable comparative testing a sludge $V_1$ was synthesized. The $V_1$ sludge was obtained by using deadlime to neutralize an acid solution of metallic salts.

Table 1 shows the composition of the solid and liquid phases of this sludge.

This sludge had a dry materials content of approximately 261 g per kg of sludge (26% dry solid material). It was diluted to 6% by adding water to produce the sludge $V_1$.

b) Second sludge $V_2$.

This was waste sludge from the metal surface treatment industry (chromium-plating and nickel-plating of bicycle components) obtained from an effluent treatment system comprising in succession:

chemical reduction of the chromates by addition of sodium bisulfite in an acid medium, and neutralization of the quicklime to a pH of around 10 at the rate of 14.1 g of quicklime/kg of effluent.

The essential characteristics of this sludge were as follows:

suspension liquid pH: 9.8
dry residue at 110° C.: 60.7 g/kg concentration of ionizable salt metals (mg/kg of dry material):

| | |
|---|---|
| Sodium | 8 518 |
| Calcium | 6 175 |
| Trivalent chromium | 980 |
| Iron | 192 |
| Nickel | 1 310 |

2. Nature of pozzolanic materials used.

Various pozzolanic materials were selected.

They are respectively identified hereinafter by the reference letters A through E.

A is a silica smoke marketed by the French company SOFREM.

B is a commercial thermal silica having the following properties:

| Chemical analyses: | | |
|---|---|---|
| $ZrO_2$ | 1.3% | |
| $Al_2O_3$ | 3.4% | |
| $Fe_2O_3$ | 0.2% | Moisture content 0.22 at 100° C. |
| $Na_2O$ | 0.2% | Fire loss (excluding $H_2O$) 0.3% |
| CaO | 0.04% | between 100 and 1 000° C. |
| C | 0.07% | pH of a 4% aqueous suspension: 4.4 |
| $K_2O$ | 0.06% | |
| $SO_3$ | 0.006% | |
| $SiO_2$ | 94% | |

Physical properties:
Theoretical density: 2.2 g/cm$^3$
Apparent density (uncompacted): 0.24 g/cm$^3$
Specific surface area (B.E.T.): 14 m$^2$/g
Particle size: 90% less than 2 μm
80% less than 1 μm
10% less than 0.2 μm
$\phi_{50}$ = 0.55 μm This thermal silica consists essentially of microspheres of vitreous silica.

C is a pozzolan marketed by TUBAG.

D is a natural pozzolan from VOLVIC (France).

E is a silica-based material available in large quantities as a waste byproduct of the glass tempering process used in earlier times by the glassmaking industry.

Chemical analyses (% weight):
at least 90% $SiO_2$
1.5% hydrated $Na_2O$
0.02% carbon-based organic material
$Fe_2O_3$ remainder The particle size of this powder is less than 5 μm.

The use of the material E (for which no use has previously been found) is of great economic benefit as compared with the use of commercially available pozzolanic materials which are generally relatively costly.

I. Examples of the use of the invention to treat the synthetic sludge $V_1$

The figures for each test are adjusted to relate to 1 kg of untreated sludge $V_1$.

Tests 1 through 6 were control tests.

Tests 7 through 22 were carried out using the method in accordance with the invention.

To 1 kg of sludge $V_1$ there were added each time either 60 g or 120 g of quicklime CaO and double this quantity of the pozzolanic material A, B, C, or E. The mixture was then homogenized by agitation before filtering at a pressure of 196 or 392 kPa.

As recorded in table 2, the weight of the filtrate, the weight of the final waste product and its volume were measured for each test.

The results of these tests show the favorable effect of the filter pressure which reduces the final weight of solid waste product and increases the volume of the filtrate obtained, the final waste product weight decreasing in the order of materials A, B, E, C.

Other tests described hereinafter show the favorable influence on the filterability of the sludge $V_1$ of the pozzolanic materials added to it.

The filterability of a sludge may be characterized by the following parameters:

1. The specific resistance to filtration: $\alpha$
2. The compressibility coefficient of the filter cake: S
3. The limit-dryness of the cake: sl These parameters are discussed in the AFNOR (French Standards Institution) publication T97-0001 of November 1979 (pages 1 through 14) on the subject of: Experimental standards—sludge tests—determination of characteristics related to capacity for concentration.

$\alpha$ is defined as the specific resistance to filtration of the filtered suspension. It is independent of the concentration of the suspension and depends essentially on the size, shape and degree of agglomeration of the solid particles constituting the filter cake.

Table 3 shows the specific resistance obtained by adding chalk and pozzolanic materials to the $V_1$ sludge in comparison with that for the $V_1$ sludge alone.

The table shows that pozzolanic materials C and D improve filterability.

Table 4 shows that adding pozzolanic reagents decreases the value of S very significantly.

Table 5 shows the limit dryness results of adding pozzolanic materials compared with the sludge $V_1$ alone.

The results summarized in tables 2 through 5 show that the pozzolanic materials improve the filterability of the synthetic sludge $V_1$.

Further tests summarized in table 6 show the results achieved with regard to solidifying cakes obtained from tests numbers 1 through 22 as listed in table 2.

Method:

Immediately after filtration cylindrical samples (diameter 3.5 cm, height 5.5 cm) were taken from the various filter cakes and allowed to solidify for 28 days in the case of a first batch and for six months in the case of a second batch. The samples were then placed in water with no agitation and their appearance checked periodically for up to 15 hours from immersion.

The results are summarized in table 6, which uses the following notation:

| | |
|---|---|
| 0 | material crumbled immediately placed in the water or very shortly afterwards; |
| + | material entirely disintegrated after 15 hours; |
| + + | material partly disintegrated to a final state comprising small (<15 mm) fragments; |
| + + + | partial disintegration yielding a final state of large (>15 mm) fragments; |
| + + + + | material cracked; |
| + + + + + | physical state unchanged; |
| + + + + + + | material unbreakable by hand. |

Table 6 shows that the materials treated by the method in accordance with the invention are generally much more durable than the sludge alone or the sludge treated only with chalk.

Further tests (leaching tests) showed that, in relation to retention of pollutants, after six months maturing the metals Cr, Ni, Cu, Fe, Cd, Mn were no longer detectable in the aqueous phases obtained by leaving 100 g of solidified cake in contact with 1 liter of water with no agitation for 15 hours.

II. Example of the use of the method in accordance with the invention to treat the sludge $V_2$ The Figure is a schematic view of an installation for implementing the method in accordance with the invention.

The sludge $V_2$ is transferred into a cylindrical-conical tank 1 with a capacity of approximately 20 m³ and agitated by blowing in air through a downwardly directed tube 2. A reagent tank with a capacity of approximately 300 l on the upstream side of the tank 1 is used to add the chalk.

The tank 3 is fed with sludge from the tank 1 by the permanent action of a recycling pump 3.

The tank 3 overflows into the tank 1 and is filled with the same sludge $V_2$ which is agitated by the through-current caused by the pump 4.

The process comprised the following stages:

a) an excess of powdered quicklime was added to the reagent tank at the rate of 11 g of chalk per kg of untreated sludge. After a few minutes the chalk was integrally mixed throughout the mass of the liquid sludge in the installation. The measured pH was 12.7.

b) the selected pozzolanic material (thermic silica B in this case) was added directly to the cylindrical-conical tank 1 at the rate of 11 g per kg of initial sludge.

c) agitation was maintained in the tank 1 for 10 to 15 minutes. The mixture was fed to a filter press (not shown) by the pump 5.

d) the mixture was fed to a plate-type filter press with 60×60 cm plates and pressed in batches at 4 kg/cm².

e) the filter cakes were collected for final storage or discharge, possibly after compaction.

Samples were also taken.

After 28 days the cylindrical samples (3.5 cm diameter, 5.5 cm height) were very hard and impossible to break by hand. A leaching test carried out without agitation and under the same conditions as for the sludge $V_1$ showed the advantages of the process in accordance with the invention as compared with treatment with chalk alone (table 7).

TABLE 1

| PARAMETER | SOLID PHASE* | LIQUID PHASE** |
|---|---|---|
| pH | — | 9.48 |
| Resistivity (ohm · cm) | — | 15 |
| Residue at 110° C. | 303 450 | 7 163 |
| Residue at 550° C. | 256 260 | 4 945 |
| Sulfates ($SO_4^-$) | — | 150 |
| Chlorides ($Cl^-$) | — | 2 961 |
| Nitrates ($NO_3^-$) | — | 254 |
| Metals | | |
| Sodium | 510 | 307 |
| Calcium | 91 210 | 2 299 |
| Potassium | 127 | 6.75 |
| Cadmium | 62 | 0.1 |
| Chromium | 1 750 | 57 |
| Copper | 2 460 | 0.058 |
| Iron | 22 140 | 0.133 |
| Manganese | 98 | 0.034 |
| Nickel | 1 360 | 0.22 |
| Lead | 239 | 0.35 |
| Zinc | 23 700 | 0.1875 |

*results expressed in mg/kg of sludge
**results expressed in mg/l of sludge

TABLE 2

| TEST | QTY OF REAGENT USED (g) CaO | QTY OF REAGENT USED (g) POZZOLAN | FILTER PRESSURE (kg/cm²) | WEIGHT OF FILTRATE (g) | WEIGHT OF SOLIDIFIED FINAL WASTE PRODUCT (g) | VOLUME OF FINAL WASTE PRODUCT (cm³) |
|---|---|---|---|---|---|---|
| 1 | 0 | 0 | 2 | 878 | 122 | 91 |
| 2 | 0 | 0 | 4 | 890 | 110 | 82.5 |
| 3 | 120 | 0 | 2 | 790 | 330 | 301 |
| 4 | 60 | 0 | 2 | 894 | 166 | 153 |
| 5 | 120 | 0 | 4 | 810 | 310 | 285 |
| 6 | 60 | 0 | 4 | 920 | 140 | 141 |
| 7 | 120 | A = 240 | 2 | 500 | 860 | 712 |
| 8 | 60 | A = 120 | 2 | 645 | 535 | 433 |
| 9 | 120 | A = 240 | 4 | 520 | 840 | 606 |

TABLE 2-continued

| TEST | QTY OF REAGENT USED (g) CaO | POZZOLAN | FILTER PRESSURE (kg/cm$^2$) | WEIGHT OF FILTRATE (g) | WEIGHT OF SOLIDIFIED FINAL WASTE PRODUCT (g) | VOLUME OF FINAL WASTE PRODUCT (cm$^3$) |
|---|---|---|---|---|---|---|
| 10 | 60 | A = 120 | 4 | 680 | 500 | 414 |
| 11 | 120 | B = 240 | 2 | 575 | 785 | 539 |
| 12 | 60 | B = 120 | 2 | 745 | 435 | 298 |
| 13 | 120 | B = 240 | 4 | 595 | 765 | 500 |
| 14 | 60 | B = 120 | 4 | 765 | 415 | 279 |
| 15 | 120 | C = 240 | 2 | 690 | 670 | 452 |
| 16 | 60 | C = 120 | 2 | 800 | 380 | 269 |
| 17 | 120 | C = 240 | 4 | 722 | 638 | 404 |
| 18 | 60 | C = 120 | 4 | 810 | 370 | 250 |
| 19 | 120 | E = 240 | 2 | 665 | 695 | 481 |
| 20 | 60 | E = 120 | 2 | 775 | 405 | 279 |
| 21 | 120 | E = 240 | 4 | 700 | 660 | 443 |
| 22 | 60 | E = 120 | 4 | 790 | 390 | 260 |

TABLE 3

| FORMULATION | PRESSURE | SLOPE OF t/V-f(V) LINE | CORRELATION COEFFICIENT | SPECIFIC RESISTANCE $\alpha$ (m/kg) |
|---|---|---|---|---|
| Sludge + CaO + A | 0.5 | 0.215 | 0.999 | $1.37 \cdot 10^8$ |
|  | 2 | 0.0895 | 0.999 | $2.29 \cdot 10^8$ |
|  | 4 | 0.0611 | 0.999 | $3.12 \cdot 10^8$ |
|  | 7 | 0.0483 | 0.999 | $4.33 \cdot 10^8$ |
| Sludge + CaO + B | 0.5 | 0.158 | 0.999 | $1.01 \cdot 10^8$ |
|  | 2 | 0.0715 | 0.999 | $1.83 \cdot 10^8$ |
|  | 4 | 0.0478 | 0.999 | $2.44 \cdot 10^8$ |
|  | 7 | 0.0321 | 0.999 | $2.88 \cdot 10^8$ |
| Sludge + CaO + C | 0.5 | 0.0452 | 0.999 | $2.17 \cdot 10^7$ |
|  | 2 | 0.0197 | 0.999 | $5.04 \cdot 10^7$ |
|  | 4 | 0.0132 | 0.998 | $6.76 \cdot 10^7$ |
|  | 7 | 0.0108 | 0.999 | $9.59 \cdot 10^7$ |
| Sludge + CaO + D | 0.5 | 0.121 | 0.999 | $7.74 \cdot 10^7$ |
|  | 2 | 0.0320 | 0.999 | $8.19 \cdot 10^7$ |
|  | 4 | 0.0206 | 0.997 | $1.053 \cdot 10^8$ |
|  | 7 | 0.0139 | 0.996 | $1.24 \cdot 10^8$ |
| Sludge only (control) | 0.5 | 0.0611 | 0.999 | $9.49 \cdot 10^7$ |
|  | 2 | 0.0299 | 0.999 | $1.86 \cdot 10^8$ |
|  | 4 | 0.0224 | 0.999 | $2.78 \cdot 10^8$ |
|  | 7 | 0.0191 | 0.998 | $4.15 \cdot 10^8$ |

TABLE 4

| FORMULATION | CORRELATION FACTOR | COMPRESSIBILITY COEFFICIENTS |
|---|---|---|
| Sludge + CaO + A | 0.994 | 0.427 |
| Sludge + CaO + B | 0.998 | 0.403 |
| Sludge + CaO + C | 0.998 | 0.556 |
| Sludge + CaO + D | 0.913 | 0.177 |
| Sludge | 0.998 | 0.712 |

TABLE 5

| FORMULATION | PRESSURE (kg/cm$^2$) 2 | 4 | 7 |
|---|---|---|---|
| SLUDGE + CaO + A | 44.5% | 49.5% | 53% |
| Sludge + CaO + B | 47.8% | 51.9% | 55.5% |
| Sludge + CaO + C | 50.7% | 54.9% | 57.8% |
| Sludge + CaO + D | 54% | 60.1% | 61.6% |
| Sludge only (control) | 33% | 36.9% | 40.8% |

TABLE 6

| TEST | OBSERVATIONS AFTER 28 DAYS | OBSERVATIONS AFTER 6 MONTHS |
|---|---|---|
| 1 | + + + + | + + + |
| 2 | + + + + | + + + |
| 3 | + + + + | + + + |
| 4 | + + + + | + + + |
| 5 | + + + + | + + |
| 6 | + + + + + | + + + |
| 7 | + + + + | + − − − + |
| 8 | + + + + | + + + + |
| 9 | + + + + | + − + + + |
| 10 | + + + + | − − − |
| 11 | + + + | + + + |
| 12 | + + + | − − − |
| 13 | + + | + − − − + |
| 14 | + + + | + − − − |
| 15 | + + + + + | + + − − − + |
| 16 | − − − − − | − − − − |
| 17 | + + + + + | + − − − − |
| 18 | + + + + + | − − − − − |
| 19 | + + + + + | + − − − − |
| 20 | + + + + − | − − − − |
| 21 | + + + + + | − − − − − |

TABLE 6-continued

| TEST | OBSERVATIONS AFTER 28 DAYS | OBSERVATIONS AFTER 6 MONTHS |
|---|---|---|
| 22 | +++++ | +++++ |

TABLE 7 sludge $V_2$: leachability of pollutants after treatment, quantities dissolved in a leaching test in mg per kg of treated material.

| COMPONENT | TREATMENT | |
|---|---|---|
| | CHALK | CHALK + POZZOLAN |
| Total salinity | 10 240 | 7 880 |
| Sulfates | 4 390 | 2 800 |
| Sodium | 3 100 | 2 100 |
| Calcium | 700 | 310 |
| Trivalent chromium | 220 | 80 |
| Iron | <1 | <1 |
| Nickel | <0.5 | <0.5 |
| pH of the lixiviate | 11.6 | 6.0 |

I claim:

1. A method of chemically solidifying an industrial sludge, comprising:
   (a) forming a mixture of a diluted aqueous sludge having a pH greater than 9 and a dry material concentration of between 3 and 20% by weight with respect to the sludge with a sufficient amount of chalk and a pozzolanic reagent to obtain a homogenous mixture having a weight ratio of calcium hydroxide/dry material between about 1 and 2 and a weight ratio of pozzolanic material/calcium hydroxide of about 2;
   (b) separating a solid phase and a liquid phase from said mixture by mechanical dewatering, thereby removing about 35-40% of the aqueous phase of the initial sludge; and
   (c) recovering at least said solid phase, which is permitted to set and harden.

2. The method according to claim 1, wherein said mechanical dewatering includes filtration or centrifugation.

3. The method according to claim 1, wherein the sludge is diluted to obtain the dry material concentration of between 3 and 20% by weight with respect to the sludge.

4. The method according to claim 1, wherein said liquid phase is recovered.

5. The method according to claim 4, wherein about 35 to 40% of said aqueous liquid phase of said sludge is recovered and recycled.

6. The method according to claim 1, wherein the pH is raised above 9 by adding chalk.

7. The method according to claim 1, wherein said chalk is selected from the group consisting of quicklime (CaO) and deadlime (Ca(OH)$_2$).

8. The method according to claim 1, wherein the pozzolanic reagent is selected from the group consisting of fly ash, silica-based material, natural pozzalan, and mixtures thereof.

9. The method according to claim 8, wherein said pozzolanic material is a silica-based material.

10. The method according to claim 9, wherein said silica-based material is a waste product of tempering glass.

11. The method according to claim 10, wherein said waste product is a powder having a particle size of less than 5 microns and containing at least 90% by weight silica.

* * * * *